United States Patent Office.

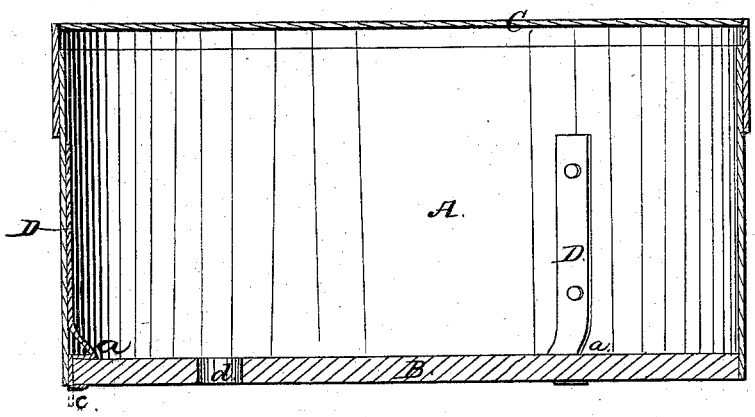
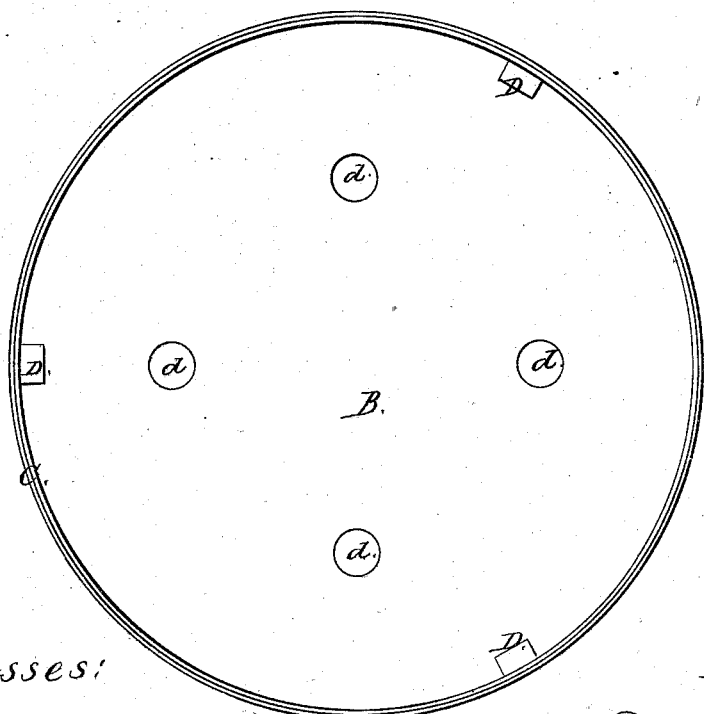

JAMES WHITE, OF CLEVELAND, OHIO.

Letters Patent No. 68,019, dated August 20, 1867.

IMPROVEMENT IN FRUIT-BOX.

The Schedule referred to in these Letters Patent and making part of the same.

TO ALL WHOM IT MAY CONCERN:

Be it known that I, JAMES WHITE, of Cleveland, in the county of Cuyahoga, and State of Ohio, have invented certain new and useful improvements in Fruit-Boxes; and I do hereby declare that the following is a full and complete description of the same, reference being had to the accompanying drawings, making a part of this specification, in which—

Figure 1 is a vertical section of the box.
Figure 2 is a view of the under side.
Like letters of reference refer to like parts in the views.

This box is of the ordinary form, and can be made of any desired size. A is the body, B the bottom, and C the cover or lid. This box is so constructed that the fruit can be filled in from the movable bottom. Secured on the inside of the box are metallic strips D, which extend down to the bottom B, forming a shoulder at $a$. $d$ are holes in the bottom B for ventilation.

When the box is to be filled the cover is put on, and then the box turned upside down, with the bottom removed. The fruit is then put in, and when the box is filled the bottom is put in place, resting on the shoulders $a$, above referred to; then, by means of the strips D, is secured and held firmly in place; the end indicated by the dotted line $c$, fig. 1, being lapped down on to the bottom, and by this means it is held between the shoulders $a$ and ends $c$ of the strips. The strips D referred to may be made without the shoulder $a$, and extend straight down, the end lapping down on the bottom, as stated; or they may be made of wire, and more or less in number.

What I claim as my improvement, and desire to secure by Letters Patent, is—

The movable bottom B, in combination with the strips D and box, substantially as and for the purpose set forth.

JAMES WHITE.

Witnesses:
W. H. BURRIDGE,
J. HOLMES.